March 30, 1971  D. L. ELBERT  3,573,147
SYNTHETIC TURF PRODUCTS HAVING VARIABLE BLADE WIDTHS
Filed Jan. 24, 1968
FIG. 1.
FIG. 2.
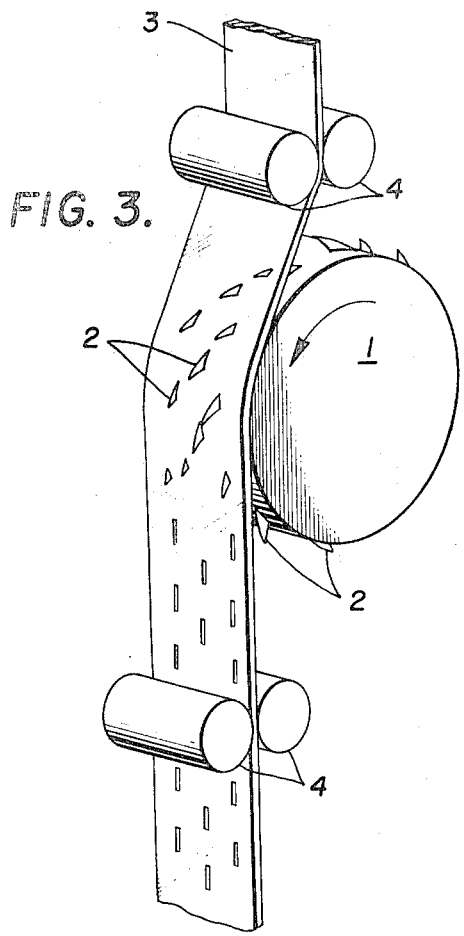
FIG. 3.
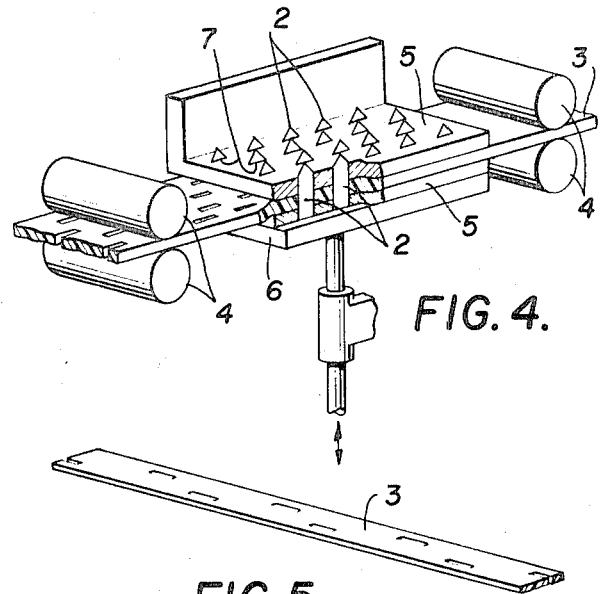
FIG. 4.
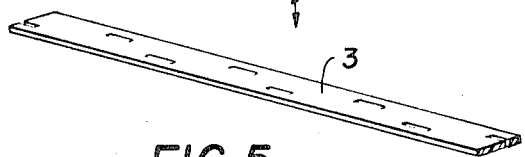
FIG. 5.
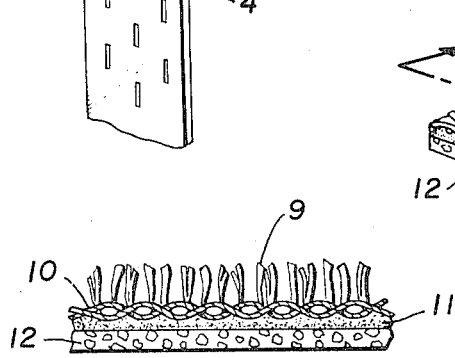
FIG. 7.
FIG. 6.
INVENTOR.
DONALD LEE ELBERT
BY
ATTORNEY

United States Patent Office 3,573,147
Patented Mar. 30, 1971

3,573,147
SYNTHETIC TURF PRODUCTS HAVING VARIABLE BLADE WIDTHS
Donald L. Elbert, Gulf Breeze, Fla., assignor to Monsanto Company, St. Louis, Mo.
Filed Jan. 24, 1968, Ser. No. 700,096
Int. Cl. A41g 1/00
U.S. Cl. 161—21                                16 Claims

ABSTRACT OF THE DISCLOSURE

Random discontinuous slits cut in monofilament ribbons before weaving, knitting, tufting, or otherwise binding provide in a finished synthetic turf product, random variable blade widths with physical characteristics and appearance similar to that of natural grass.

BACKGROUND OF THE INVENTION

This invention relates to an improved synthetic turf which simulates grass. More particularly, the invention relates to a grass-like turf useful both indoors and outdoors for appearance purposes or for recreational and sports activities.

Highly successful synthetic outdoor surface covers, which closely simulate grass and are not adversely affected by exposure to weather or abusive wear, have been produced by using a weather-resistant backing and heavy denier cut pile ribbons secured therein with a suitable latex. Such outdoor synthetic covers have been provided with physical characteristics as closely as possible resembling that of natural grass. Grass-like appearance while new and after subjection to prolonged wear and abuse, and grass-like rebound properties and wear patterns are but a few of the desirable characteristics of artificial grass.

Commercially successful artificial grass has been produced from ribbon-like monofilament fibers extruded from rectangular slotted orifices dimensioned to produce monofilament ribbons having a thickness of between 0.001 and 0.003" and a width of between 0.01 and 0.20", and with rectangular cross-sections characterized by widths of at least 3 times greater than their thickness, and having a denier of at least about 300. These monofilament ribbons have been found to possess good flexing and bending characteristics and an appearance similar to that of natural grass. U.S. Pat. 3,332,828 gives a detailed description of characteristics and of the production of an example of such an artificial grass as is produced by monofilament ribbons. However great the commercial success of artificial grasses produced by monofilament ribbons as described in the prior art, and however similar in appearance are these monofilament ribbons to blades of natural grass, their appearance as well as their wear patterns are lacking in one significant aspect of the natural appearance of mowed genuine grass; that is, the random blade dimensions of the true grass.

Blade dimensions could, of course, be varied through the use of ribbons of different denier, weaving the same into the finished product, even establishing randomness and avoiding patterns or streaks in the final product, through the use of known but very complicated techniques in the art of weaving and tufting. The complex nature of such a production would seriously detract from its commercial feasibility, and, either for this reason or for the lack of any apparent need for such random blade dimensions, there has apparently been no attempt made in the art to so provide.

SUMMARY OF THE INVENTION

It is therefore an object of this invention to provide a synthetic turf having random variable blade width.

It is a second object of this invention to produce a monofilament ribbon suitable for the production of a synthetic turf having variable blade width.

It is still another object of this invention to provide a method for the production of a monofilament ribbon suitable for production of a synthetic turf product having random variable blade width.

Briefly, the objects of this invention are accomplished by means of cutting discontinuous random slits longitudinally along the continuous monofilament ribbon through the narrow dimension or thickness of the ribbon, and spaced variably across the width of the ribbon. These slits can be easily produced by running the ribbon, under appropriate tension, across and in contact with the peripheral surface of a rotating cylindrical wheel having, longitudinally disposed on the periphery thereof, a plurality of cutter blades irregularly positioned with respect to the sides of the wheel. The ribbon is then subjected to conventional weaving, knitting or tufting operations, or is otherwise bound, the slits in the ribbon providing therein, among the cut pile or otherwise bound linear monofilament blades, random variations in blade widths.

Other objects and advantages of this invention will be apparent from the detailed specification and the following drawing in which,

BRIEF DESCRIPTION OF THE DRAWING

FIG. 1 is a cross section, greatly enlarged of a preferred thermoplastic ribbon, suitable for the present invention;

FIG. 2 is a cross section, greatly enlarged, of a longitudinally striated ribbon also suitable for the present invention;

FIG. 3 is a perspective view of a preferred slitting wheel to be used in the practice of the instant invention;

FIG. 4 is a schematic perspective view of another preferred slitting apparatus;

FIG. 5 is a perspective view of the monofilament ribbon having slits as in the instant invention;

FIG. 6 is a perspective view of a preferred embodiment of the finished turf illustrating its grass-like appearance in a woven construction; and FIG. 7 is a cross sectional view of the turf, enlarged, showing a preferred construction of the instant invention.

DESCRIPTION OF THE PREFERRED EMBODIMENT

Monofilament ribbons suitable for the practice of the instant invention are, just prior to weaving or the formation of a non-woven product, of a preferred denier of from about 300 to about 1200. Deniers of from 500 to 900 produce the most durable and grass-like characteristics in the finished product. These monofilaments are extruded from polyamides, polyesters, and polypropylene, but preferably the polyamides which include nylon 66, nylon 6, nylon 4, nylon 610, nylon 11 and their filament forming copolymers. The filaments should be generally flat and ribbon-like to simulate natural grass and possess suitable bending properties. They may be delustered to reduce the sheen produced by the flat surfaces of the ribbons, as for example by imparting longitudinal striations to the ribbons during the extrusion process. Filaments having round, oval, arcuate, or other cross sectional configurations can be used, but their desirability decreases as their cross sectional configurations vary from a rectangular form. Ribbons having a thickness of between 0.001 and 0.003", and a width of between 0.01 and 0.20" possess flexing and bending characteristics most suitable as a substitute for natural grass turf. They may be treated with surfactants or other means for roughing the surface to facilitate fabrication thereof and prevent foot wear slippage. Ribbons at this stage of processing have a cross section generally as shown in FIG. 1 or FIG. 2, FIG. 2 showing only one of many possible striation variations on the monofilament ribbon.

At any convenient point in processing between extrusion and weaving, the ribbon is subjected to random slitting. Since synthetic fibers or filaments of various types are subjected to a variety of washing, stretching, setting, and finishing steps, depending upon the type of fiber or filament, and upon the desired characteristics in the finished product, a processing point should be selected for slitting, which depends upon the type of processing, as well as processing equipment used in the treatment of the filaments. Generally, it is preferable to perform the slitting step at a point where the ribbon is processed at the lowest linear speed. Ordinarily, this would be prior to all or a part of the stretching operation. By slitting before stretching, not only is the linear speed of the ribbon slower than after stretching, but, as well, the length of the slits need not be as great as desired in the finished ribbon.

Slitting may be accomplished by any convenient means. A wheel type slitter such as that shown in FIG. 3 is the simplest and most readily adaptable method of accomplishing the random slitting operation, particularly if done prior to stretching. Where longer slits are desired, and particularly where the slitting is accomplished after stretching, the ribbon may be drawn over a perforated surface through which random blades mounted on a reciprocating bar are projected at timed intervals as the ribbon progresses.

In either case the slits remain in the ribbon without affecting the ribbon denier and without interfering with the subsequent weaving, knitting, tufting and/or binding operations. When the ribbon is woven or tufted or otherwise made into a carpet-like material and the ribbon loops, if any, are cut, the uppermost portion of many of the blades will consist of two parts, each of less width than the basic filament.

The number of blades comprising split ribbons, and the width variation of the split ribbon parts, as well as the average length of the splits will, of course, be determined by the number and location of slitting blades to which the ribbon is subjected. As there are many species of natural grass, it may be desired to match the slitting operation experimentally with the natural grass desirably simulated. In general, the discontinuous slits will be at least 0.25 inch long but will not exceed the length of a full loop in the finished product or twice the length of a blade of the synthetic grass. Longitudinal intervals of about 1.50 inches between slits will normally provide a relatively high ratio of length of unslit ribbon to that of slit ribbon.

It may also be desirable to use different slit patterns on different continuous filaments or different groups of continuous filaments used in the weaving or tufting, to obtain complete randomness by thoroughly mixing slit patterns or by varying the starting point of each pattern as it is used.

The ribbon should be drawn and treated to provide the physical properties desired depending upon the polymer composition and the utilization planned for the turf. Preferably, thermoplastic material is pigmented green to simulate the color of grass, although other colors may be used for special effects.

It is known that the addition of certain pigments to thermoplastic materials such as nylon and polyester may increase resistance to degradation by ultraviolet light although many pigments, particularly inorganic materials, tend to accelerate such degradation. I have found that a mixture of about 0.50 percent of a phthalocyanine green and 1.50 percent cadmium yellow based on polymer weight provides a good color depth and sufficient stabilization against ultraviolet light for most applications.

Phthalocyanine green refers to the well-known chlorinated copper phthalocyanine chelate compounds widely used as colorants; for example, Monastral Green and Mapado Green pigments made by E. I. du Pont de Nemours, Pigment Department, Wilmington, Del. Cadmium Lithopone yellow designates the common yellow inorganic pigments consisting principally of cadmium sulfide. The cadmium yellow pigments supplied by the Glidden Company, Baltimore, Md. and by Kentucky Color Company, Louisville, Ky., have proven quite satisfactory.

If desired, the nylon may be further stabilized by the incorporation of any of a number of well known UV absorbers which are compatible with the resin. These include such compounds as the aryl esters of phosphoric acid, the alkaryl phosphinates, zinc phosphates, manganous salts, chromium salts, and copper salts. For optimum weather resistance properties the nylon ribbons should be placed under the minimum tension possible.

The backing material may be formed with fibers prepared from polyesters, polyacrylonitrile, polypropylene and nylon, but preferably polyesters and polyacrylonitrile. Formation of the backing may be accomplished by weaving and knitting or any if the known processes for preparing non-wovens, particularly needle punching. The backing fibers are perferably green solution dyed to add color depth to the turf and thus enhance the grass-like appearance thereof where this result is desired; however, white or conventionally dyed fibers of green or other colors may be employed.

For turf which will be used outdoors the acrylic fibers are preferred because of their excellent weather-resistant properties. Turf made for indoor installation is preferably constructed from backings formed from polyester fibers because they possess better strength properties than the acrylic fibers. Of course nylon fibers are stronger than polyester fibers, but the stretch characteristics of nylon fibers make them less dseirable for most purposes.

In accordance with one embodiment of this invention, monofilament ribbon face fiber and the warp and fill backing fiber are woven together on a conventional Wilton cutpile loom. The loom may be set to provide any desired face pile height, normally between ⅛ inch and 1 inch, with a face density between 10 and 40 ounces per square yard, and normally about 24 ounces per square yard. The pile height is determined by the particular utilization of the turf. It has been found that for general playground activities such as tennis, volleyball, baseball, softball, touch football, soccer and badminton, a pile height of about ⅜ to ½ inch is preferred. For other applications such as tee-off pads on golf driving ranges and par-3 courses, a turf having a nylon pile height of about ¾ inch is preferred. A backing composed of fibers fashioned into a fabric having 9 picks per inch and 10 ounces per square yard is satisfactory for most common applications.

One alternative to weaving the turf fabric on a Wilton or similar loom, contemplates tufting the facing ribbon into a backing material to produce a turf of fair quality by tufting 5 or 6 plies monofilament ribbons on a ⅛ gage machine and at a density of about 24 ounces per square yard into a dimensionally stable woven or non-woven backing fabric using standard tufting techniques.

An example of a suitable tufting medium or backing fabric is a 5 to 10 ounces per yard nylon scrim reinforced needle punched fabric formed from acrylic staple fibers which has been treated with about 1.5 ounces per square yard of an 80/20 mixture of Hycar 1571 Resloom M–80 resin. Hycar 1571 is a water emulsion of butadiene-acrylonitrile copolymer sold by B. F. Goodrich Chemical Co., Cleveland, Ohio, and Resloom M–80 is a melamine-formaldehyde resin sold by Monsanto Co., St. Louis, Mo.

Another backing material suitable for tufting is a nylon scrim reinforced polyurethane foam carpet backing which is marketed under the trade name, Chemback by the Chemstrand Co., Division of Monsanto Co. Chemback is comprised of an open-mesh woven nylon scrim coated with foamed polyurethane having a density of approximately 2 lbs. per cubic foot. Chemback is produced in thicknesses of approximately 0.06 to 0.10 inch and in weights of 3 to 6 ounces per square yard.

Another preferred method for producing the product of this invention is accomplished by knitting the face ribbon and the backing fibers. The knitting operation may be performed on a conventional flat-bed, warp-knitting machine which has been provided with a cutting attachment adapted to cut the loops to produce a cut-pile face. A typical machine as described is manufactured by the Kidde Machine Co., Bloomfield, N.J.

After weaving, knitting or tufting the face ribbon with the backing to produce a turf fabric, a solution of latex or the like is applied to the back of the fabric by padding or other acceptable means. The latex provides dimensional stability to the fabric and also serves to anchor the ribbons in the backing material. It must therefore be of a composition which has good adhesion to both the synthetic ribbon and the synthetic backing material. One such latex composition is a dispersion of Lotal 7562, Pyratex, Dow Corning Antifoam and Alcogum.

A typical latex formulation suitable for use in this invention consists of by weight:

|  | Parts | Percent solids |
| --- | --- | --- |
| Lotol 7562 | 830 | 52 |
| Pyratex | 173 | 42 |
| D. C. antifoam | 0.25 | 12 |
| Alcogum | 14.5 | 11.5 |

Lotol 7562 is a compounded natural rubber latex sold by the Naugatuck Chemical Division of U.S. Rubber, Naugatuck, Conn.; Pyratex is a vinyl pyridene terpolymer also sold by Naugatuck Chemical; Dow Corning Anti-foam is a silicone oil sold by Dow Corning, Midland, Mich.; and Alcogum is a sodium polyacrylate viscosity control agent sold by Alco Chemical Corp., Philadelphia, Pa.

The Lotol, Pyratex, and Antifoam are combined and agitated to prepare the latex composition. The Alcogum is added to the mixture until the viscosity of the solution is increased to about 2000 cp. on the Brookfield viscometer. Between about 2 and 6 ounces per square yard based on solids of the latex solution is padded or otherwise applied to the backing fabric of the turf. The latex is dried and then cured at about 325° F. for 5 minutes.

After applying and curing the latex, the turf is dimensionally stable and may be employed as a useful product without further treatment. However, it has been found that the wear properties of the turf are enhanced if a resilient foam backing is applied before use. For outdoor applications, a PVC (polyvinylchloride) closed cell foam or solid PVC is preferred because of its excellent strength and well known weather resisting properties. An open cell PVC foam is suitable for indoor uses but generally is not desirable for outdoor installation because of its propensity to absorb large amounts of moisture. However, if the turf is going to be used indoors, other elastomers such as latex foam and polyurethane also may be used with good results.

The foam may be applied by any of the conventional techniques which are well known in the art. Either mechanical, physical or chemical foaming may be employed, and the foam sheet may be either cast and cured directly on the back of the turf, or cast separately and cemented in place. The foam may be any thickness and density desired, but generally a PVC foam between 1/8 and 3/8 inch thick and having a density of 15 to 55 pounds per cubic foot is preferred. A polyurethane foam of a similar thickness having a density of 1.0 to 4.0 pounds per cubic foot and reinforced with an embedded nylon scrim is also satisfactory. It is noted however that for a preferred embodiment of this invention, a PVC plastisol containing a foam stabilizer is frothed with latex foaming equipment and cast directly upon the turf to form an open cell foam having a thickness of 1/4 inch and a density of about 35 pounds per cubic foot.

Referring in detail to the drawing, FIG. 3 shows a cylindrically shaped slitting wheel 1 having blades 2 with monofilament ribbon 3 passing under tension between rollers 4 across the peripheral surface of the slitting wheel.

FIG. 4 shows filament 3 passing through roller guides 4 between juxtaposed slotted guides 5, with reciprocating cutter bar 6 having blades 2 mounted thereupon so that when cutter bar 6 is in the cutting position, blades 2 extend through slots 7 in slotted surfaces 5, and when cutter bar 6 is in the retracted position, the blades are not in contact with ribbon 3.

FIG. 6 shows in perspective, a piece of woven synthetic turf exemplifying a preferred embodiment of the instant invention.

FIG. 7 shows a cross section of the turf generally enlarged to illustrate the preferred construction thereof. The pile 9 is formed from pigmented continuous monofilament ribbon having a substantially rectangular cross sectional configuration as shown in FIG. 5. The pile is embedded in a woven synthetic fiber backing 10 and anchored securely therein by bonding agent 11. A polyvinyl chloride foam 12 has been applied on the backing to improve the physical properties of the turf.

The invention will be more easily understood from the following examples which are meant to be illustrative but not limited. In these examples, parts and percentages are by weight unless otherwise specified.

EXAMPLE I

Flat monofilament ribbons were produced by the conventional melt extrusion method with standard screw extruder and auxiliaries. The polypropylene polymer identified as "Escon 107," Grade CD70, was supplied by Enjay Chemical Company, New York, N.Y. A mixture of 1.4 percent cadmium yellow pigment and 0.6 percent phthalocyanine green pigment was incorporated in the polypropylene at the extruder inlet according to the pigment-slurring method disclosed by Brignac in patent application Ser. No. 323,143, filed Nov. 12, 1963, now abandoned. Prior to the conventional hot-block stretching of the ribbons, they were subjected to random slitting by being drawn across the peripheral surface of a rotor slitting wheel as shown in FIG. 3, causing random slits in the filament of about 0.15 inch in length and at intervals of about 0.50 inch. After stretching, the grass green filaments were 0.030" wide by 0.0018" thick having slits of about 0.45 inch in length and at intervals of about 1.50 inches.

A three-ply yarn composed of these polypropylene monofilaments was tufted into a nylon scrim reinforced polyurethane foam tufting medium and was sheared to 1/4 inch pile height with 18 ounces of polypropylene face yarn per square yard of fabric. A latex adhesive was applied to the underside of a portion of the fabric and a non-woven rayon-polyolefin scrim was applied to the adhesive to form a secondary backing.

EXAMPLE II

Analogously to the procedure described in Example I, the same type of pigment composition and extrusion system was used in conjunction with a rotary slitter to produce slitted grass-green polyethylene terephthalate ribbon monofilaments 0.045 inch wide by 0.0015 inch thick. The polyester polymer was supplied by the Chemical Division of Goodyear Tire & Rubber Company, and was designed VFR 1301-A. Five ply yarn of the polyester filaments was tufted into a nylon scrim reinforced polyurethane foam tufting medium and the tufts were cut to 1/2 inch pile height to provide 28 ounces of polyester per square yard of fabric. A very thin layer of adhesive latex was applied to the under side to bond the fabric to a pad of foamed PVC 1/4 inch thick. The resultant composite had the appearance and plushness of a well-cultivated natural grass plot.

EXAMPLE III

A 500 denier nylon 66 monofilament ribbon 0.0018 inch thick by 0.04 inch wide was prepared by conventional melt extrusion techniques, having been subjected to random slitting as in Example I. The ribbon was woven with an acrylic warp and fill backing on a Wilton cut-pile loom to produce a turf fabric having 24 ounces per square yard of nylon pile facing with a ⅜ inch pile height. The acrylic backing was woven from a 7/3's cotton count yarn spun from 3-denier, 2-inch acrylic staple, using 9 picks per inch to yield a fabric of 10 ounces per square yard. Both the nylon and the acrylic were pigmented in a grass-green color.

A latex solution consisting of 830 parts natural rubber latex, 173 parts vinyl pyridene polymer, 14.5 parts sodium polyacrylate and containing 0.25 part of a silicone oil antifoam agent, was padded onto the turf backing with and add on of 4 ounces per square yard based on dry solids. The solution was dried at 280° F. and cured at 325° F. for 5 minutes.

An open cell PVC foam having a thickness of ¼ inch and a density of 35 pounds per cubic foot was then cast upon the backing of the turf using conventional techniques to form a resilient pad.

EXAMPLE IV

A synthetic turf was produced according to the procedure of Example III except the ribbons were polyethylene terephthalate monofilament ribbons 0.002 inch thick and 0.04 inch thick.

EXAMPLE V

Example III was repeated except the nylon 66 monofilament ribbons had serrated cross-sections and the backing was prepared from polyethylene terephthalate staple fibers.

EXAMPLE VI

A synthetic turf was prepared in accordance with Example III except the ribbon and backing yarn were knitted on a flat bed warp knitting machine provided with a cutting attachment to slit the ribbon loops.

EXAMPLE VII

A synthetic nylon turf was produced according to the procedure of Example III except the PVC foam backing was not applied. Evaluation of the turf showed some shedding and matting of the nylon pile when subjected to heavy foot traffic, but the product was considered satisfactory for light service applications.

EXAMPLE VIII

A synthetic nylon turf was produced according to the procedure of Example I using 900 denier slitted nylon monofilament ribbon approximately 0.002 inch thick by 0.066 inch wide. The facing had a pile height of ⅝ inch and a density of 36 ounces per square yard. The resulting turf was stiff and had a harsh hand. Continued use of the turf indicated that it possessed excellent wear properties.

EXAMPLE IX

A backing fabric was produced by needle punching a cross-laid batting of 5-denier, 2-inch acrylic staple fibers into a nylon scrim to form a reinforced non-woven fabric weighing 5 ounces per square yard. The strength and dimensional stability of the fabric was increased by padding on 2.0 ounces per square yard of a resin solution consisting of 80 percent of a butadiene-acrylonitrile copolymer and 20 percent of a melamine formaldehyde resin. The treated fabric was dried at 280° F. for 10 minutes and cured at 310° F. for 5 minutes.

The stabilized fabric was tufted with 6 ply 500 denier slitted nylon monofilament ribbons on a conventional ⅛ gage Cobble tufting machine to provide 26 ounces per yard of nylon face. The nylon tufts were cut to form a turf with a pile height of ⅜ inch, and the back of the tufted fabric was latexed as described in Example III to firmly anchor the nylon tufts and prevent shedding A closed cell polyurethane foam having a thickness of ⅛ inch and a density of 2 pounds per cubic foot was then cast upon the backing of the turf using conventional foaming techniques to form a resilient pad.

EXAMPLE X

A synthetic nylon turf was produced according to the procedure of Example IX using 6 ply 350 denier nylon slitted monofilament ribbon having a cross-section approximately 0.001 inch thick and 0.045 inch wide. The facing had a pile height of ⅜ inch and a density of 22 ounces per square yard. The resulting turf had a considerably softer hand than the product of Example IV. Indoor wear properties were shown to be very good. The product made an excellent covering for gym floors.

EXAMPLE XI

A nylon turf was produced by tufting 6 ply 500 denier slitted nylon monofilament ribbons into a backing of ⅛ inch thick sheet of polyurethane foam which was reinforced by a nylon scrim. The tufts were cut to form a turf with a pile height of ¼ inch, and the back of the fabric was latexed as described in Example III to firmly anchor the nylon and prevent shedding. The resulting synthetic turf was resilient and demonstrated excellent wear properties when used as a surface covering for an indoor playground.

It will be apparent that the product of this invention is useful as a substitute for natural grass turf and conveniently may be employed both indoors and outdoors. The particular materials and their construction are combined to produce a new and novel product which is suitable for soft-shoe sports and cleated or spiked-shoe sports. Performance tests have proved that the synthetic turf of the present invention has ball-bounce characteristics somewhat similar to those of natural-grass turf.

In all of the above examples, the random blade dimensions produce an effect strikingly similar to that of natural grass. Properties of the turf were not adversely affected by the presence of the slits or portions of the slits located at the base of the pile rather than at the ends of the blades. Wear patterns were substantially improved by the random blade dimensions.

Various changes and modifications may be made in practicing the invention without departing from the spirit and scope thereof, and therefore, the invention should not be limited except in the appended claims.

I claim:

1. A pile product comprised of extruded thermoplastic monofilament ribbons having substantially rectangular cross-sections and random longitudinal discontinuous slits extending through their narrow dimensions, said ribbons extending from and substantially perpendicular to a backing to which said ribbons are secured, the free-ends of said ribbons being characterized by random variable widths and substantially uniform thickness.

2. A pile woven product comprised of successive rows of extruded thermoplastic monofilament ribbons having substantially rectangular cross sections and random longitudinal discontinuous slits extending through their narrowest dimension, said ribbons extending from and being substantially perpendicular to a warp and fill backing and being woven therein and secured by an adhesive material, the free ends of said ribbons being characterized by random variable widths and substantially uniform thicknesses.

3. The product of claim 2 further characterized by a resilient material adhered to the backing on the side opposite said extending ribbons.

4. The product of claim 2 in which the ribbons have from 500 to 900 denier per ribbon.

5. A pile tufted product comprised of extruded thermoplastic monofilament ribbons having substantially rectangular cross sections and random longitudinal discontinuous slits through their narrowest dimension, said ribbons being tufted into a backing to form successive rows of ribbon loops, said loops being cut to provide a cut-pile face, said ribbons being secured in the backing by an adhesive material applied to the backing on the side opposite the cut pile face, the free ends of said ribbons being characterized by random variable widths and substantially uniform thicknesses.

6. The product of claim 5 in which a resilient material is bonded to the side of the backing having the adhesive applied thereon.

7. The product of claim 5 in which the ribbons have from 500 to 900 denier per ribbon.

8. A pile product having a knitted cut-pile construction which is comprised of successive rows of extruded thermoplastic monofilament ribbons having substantially rectangular cross-sections and random longitudinal discontinuous slits through their narrowest dimension, said ribbons extending vertically from a warp and lay-in backing in which the ribbons are secured by an adhesive material, the free ends of said ribbons of said product being characterized by variable widths and substantially uniform thickness.

9. The product of claim 8 in which a resilient material is bonded to said adhesive material.

10. The product of claim 8 in which the ribbons have approximately 500 to 900 denier per ribbon.

11. The product of claim 2 in which the thermoplastic belonging to the group consisting of nylon, polypropylene and polyethylene terephthalate.

12. The product of claim 11 wherein the thermoplastic is pigmented.

13. The product of claim 5 in which the thermoplastic belonging to the group consisting of nylon, polypropylene and polyethylene terephthalate.

14. The product of claim 13 wherein the thermoplastic is pigmented.

15. The product of claim 8 in which the thermoplastic belonging to the group consisting of nylon, polypropylene and polyethylene terephthalate.

16. The product of claim 15 wherein the thermoplastic is pigmented.

References Cited

UNITED STATES PATENTS

| | | | |
|---|---|---|---|
| 3,332,828 | 7/1967 | Faria et al. | 161—62X |
| 3,431,875 | 3/1969 | Boultinghouse | 161—65X |
| 3,325,845 | 6/1967 | Sawkiw | 161—180X |
| 3,390,044 | 6/1968 | Malakoff | 161—62X |
| 3,312,583 | 4/1967 | Rochlis | 161—62 |
| 3,422,615 | 1/1969 | Norman, Jr. | 57—140 |
| 3,273,771 | 9/1966 | Beaumont | 57—140X |

PHILIP DIER, Primary Examiner

U.S. Cl. X.R.

57—140; 112—410; 139—402; 156—72; 161—67